United States Patent
Senn et al.

(12) 
(10) Patent No.: US 6,338,030 B1
(45) Date of Patent: Jan. 8, 2002

(54) PROCESSOR CONTROLLED MEASURING DEVICE

(75) Inventors: Thomas Senn, Dielsdorf; Robert Pernet, Zürich, both of (CH)

(73) Assignee: Gretag-Macbeth AG, Regensdorf (CH)

( * ) Notice: Subject to any disclaimer, the term of this patent is extended or adjusted under 35 U.S.C. 154(b) by 0 days.

(21) Appl. No.: 09/182,770

(22) Filed: Oct. 30, 1998

(30) Foreign Application Priority Data

Oct. 31, 1997 (EP) .............................. 97119069

(51) Int. Cl.$^7$ .............................. G06F 13/38
(52) U.S. Cl. .................. 702/189; 702/57; 356/213; 356/319; 709/217; 709/246
(58) Field of Search .............................. 702/189, 22, 57; 356/328, 319, 448, 213, 219; 709/217, 250, 246

(56) References Cited

U.S. PATENT DOCUMENTS

| 4,961,646 A | 10/1990 | Schrammli et al. |
| 5,267,178 A | 11/1993 | Berner |

FOREIGN PATENT DOCUMENTS

| EP | 0698785 A1 | 8/1994 |
| WO | WO96/02106 | 1/1996 |

OTHER PUBLICATIONS

"Little Brother Axis NetEye 200", Harald Bogeholz, XP–002053826, Jun. 1997, p. 91 (not translated).

Primary Examiner—Marc S. Hoff
Assistant Examiner—Hien Vo
(74) Attorney, Agent, or Firm—Burns, Doane, Swecker & Mathis, LLP

(57) ABSTRACT

A processor controlled measuring device, especially a colour meter or a spectrophotometer, includes a measuring unit, unit detects the parameters to be measured and converts them into corresponding electrical signals, a control arrangement cooperating with the measuring unit, which controls the measuring unit and processes the electrical signals produced thereby, and an input/output unit cooperating with the control arrangement for the manual operation of the measuring device and for the display of measurement results and user instructions. The control arrangement is provided by a processor on which a control program runs which implements the functionalities of the measuring device. Furthermore, an interface is provided which cooperates with the processor and through which the processor can communicate with an external processor, whereby measured data produced by the measuring device can be called up therefrom and control data controlling the processor can be fed to the processor. A data file system is implemented in the processor wherein the measurement and/or control data are stored in the form of data files of defined format. Furthermore, the data file system is available to a network through the interface. The communication between the processor and an external processor connected to the network takes place by way of the data files stored in the data file system and can thereby be achieved without a manufacturer specific data exchange protocol.

9 Claims, 2 Drawing Sheets

PROCESSOR CONTROLLED MEASURING DEVICE

This application claims priority under 35 U.S.C. §§119 and/or 365 to 97 119 069.9 filed in Europe on Oct. 31, 1997; the entire content of which is hereby incorporated by reference.

1. Field of the Invention

The invention relates to a processor controlled measuring device, especially for the detection of photometric parameters, particularly a densitometer, spectrophotometer, or colour meter.

2. Background of the Invention

Today, spectrophotometers, densitometers, and colour meters having a measuring unit, a control arrangement and an input/output unit are typically connected for data exchange with an external processor by way of a manufacturer-specific protocol and an interface (typically RS232c or IEEE 488). Colour data (Lab, LCH, Luv, XYZ . . . ) are thereby often calculated in the meter from the raw spectral/densitometrical data and then transmitted to the connected processor by way of one of the mentioned manufacturer-specific data transfer protocols.

Devices are today also available which are adapted for the offline detection of colour data. These measuring devices are connected to an external processor after offline detection and storage of the data and the detected and stored data are then transferred to the external processor by way of the manufacturer-specific data transfer protocol.

Known representative meters of this type are, for example, the hand-held spectrophotometers of the series SPM (z.B. SPM 100) of the applicant. Those and similar meters are described, for example, in U.S. Pat. No. 4,961,646, and 5,267,178 and European Application 0 698 785 (corresponds to U.S. patent application Ser. No. 08/517,678 of Aug. 22, 1995), the disclosure of which is hereby incorporated by reference.

The user interface of those meters is quite often only a relatively small display. The analyses are visualized on this display for the user or the user can make the necessary adjustments at the meter.

This manner of connecting meters with external processors which is common today is associated with different disadvantages. The data-transfer protocol must be newly programmed for each meter type, manufacturer and operating system (Windows, Unix, Mac-OS). This is associated with significant cost for the software manufacturer which writes user software for these meters.

The possible analyses of the measured data by way of the firmware available in the meter are thereby predetermined by the manufacturer and not expandable. It is not possible to load into the meter additional data analysis software modules written by other manufacturers to carry out a preprocessing or preanalysis of the data already in the meter.

The visualization of the data is only possible on the small internal display or with the help of a specially written analysis program on a connected external processor.

The data are not available in a standardized file format, although, today, data formats for the exchange of colour data are standardized by different standards organizations. These data formats cannot be produced directly by the meter. A data transfer through the manufacturer-dependent data exchange protocol to an external processor is always first required, which processor then stores the data in the respective format in a data file.

It is relatively difficult to adjust by way of the display provided at the device the parameters available at the meter, since the display often has only a low resolution and normally does not support colours.

The actual data are only accessible through a processor (the one connected with the meter through the interface). In order to make the data also available to other processors, which are, for example, connected to a network, the corresponding data must first be read by the processor which is connected with the meter using the manufacturer-dependent data exchange protocol and then transmitted in suitable form to the other processors.

SUMMARY OF THE INVENTION

Based on this prior art, it is now an object of the present invention to improve a measuring device of the generic type in such a way that data exchange with an external processor or with a network is possible without a manufacturer-specific data exchange protocol.

This and other objects of the invention which will become more apparent from the discussion hereinbelow is achieved in a processor controlled measuring device including a measuring unit for detecting the parameters to be measured and converting them into corresponding electrical signals; a control arrangement cooperating with the measuring unit for controlling the measuring unit and processing the electrical signals produced thereby, the control arrangement including a processor on which a control program runs which implements the functionalities of the measuring device; an input/output unit cooperating with the control arrangement for the manual operation of the measuring device and for the display of measurement results and user guiding information; and, interface means which cooperate with the processor for communication of the processor with an external processor, whereby measured data produced by the measuring device can be called up from the measuring device and control data controlling the processor can be transmitted to the processor; a file system connected with the processor wherein the measured and/or control data can be stored in the form of files of defined format; and means for making the file system available to a network, whereby the communication between the processor and an external processor connected to the network takes place by way of the files stored in the file system.

BRIEF DESCRIPTION OF THE DRAWINGS

The invention will be further described in the following by way of the drawing. It shows.

DETAILED DESCRIPTION OF THE PREFERRED EMBODIMENT

Figure 1:
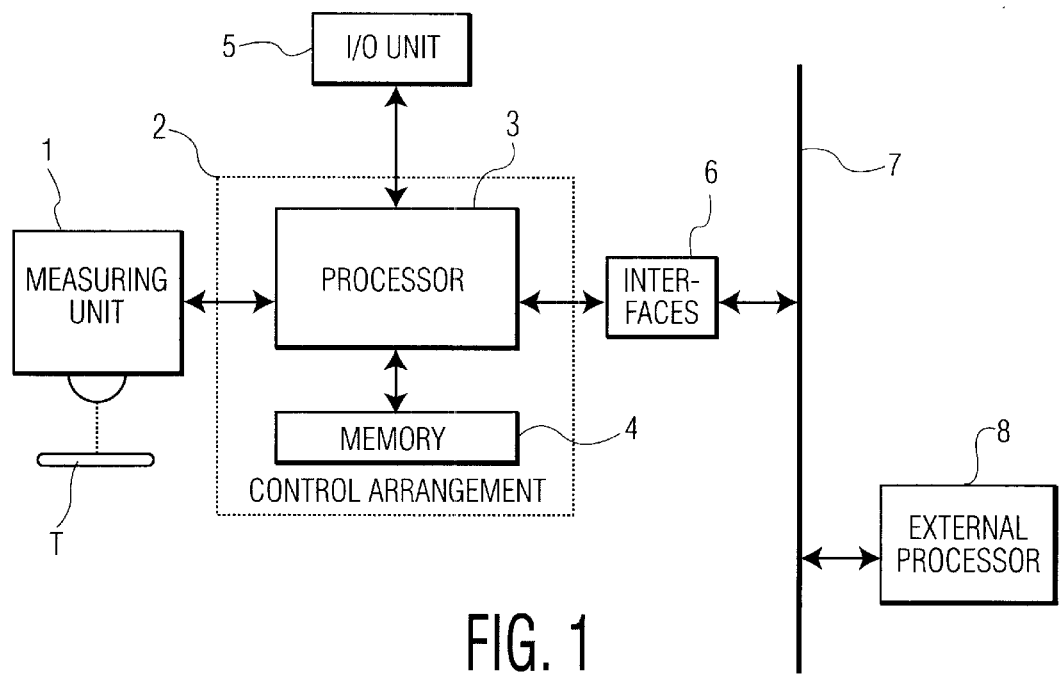
FIG. 1 a principal schematic of a first embodiment of the measuring device in accordance with the invention.

The measuring device illustrated in FIG. 1 includes a measuring unit 1, a control arrangement 2, an input/output unit 5 and interfaces 6. The control arrangement 2 includes a processor 3 which cooperates with the working and program memory 4. The interfaces 6 connect the measuring device with a network 7 to which one or more external processors 8 are connected.

The measuring unit 1 detects the desired parameter to be measured on a measured object T and converts it into a corresponding electrical signal. Typical measured parameters are, for example, spectral emission or transmission values of the measured object, which values can be further processed in the measuring device for the calculation of derived parameters, typically colour data. Other measured parameters can, of course, be detected with corresponding modification of the measuring unit 1.

The control arrangement 2 controls the measuring unit 1 and processes the electrical signals produced thereby into the desired data or measured results. Different measuring modes and calculating functions are thereby available, which are realized by way of a control program 31 (FIG. 2) which runs on the processor 3 of the control arrangement 2. The input/output unit 5 cooperating with the processor 3 typically includes a small LCD-display and several keys or similar operating devices and functions as a user interface, i.e. for the display of measured results and user instructions as well as for the manual operation of the device (selection of the measuring function or the operating mode, adjustment of parameters, triggering of the measuring process, etc.).

The interface means 6 cooperating with the processor 3, for example, a bi-directional serial interface, provide data exchange with an external processor 8. This data exchange includes the transfer of measured results (data) to the external processor as well as the transfer of control data into the processor 3 of the measuring device. The control data can thereby replace, for example, the manual input and/or can change the control program 31 itself (program expansions, upgrades, etc.).

In this generality, the measuring device corresponds, with exception of the network integration, fully and wholly with conventional measuring apparatus, as described, for example, in the above-mentioned documents U.S. Pat. Nos. 4,961,646, 5,267,178 and EP 0 698 785 in detail, or as distributed by the applicant under the designations as SPM 100 or S19. With respect to the general construction and the general function of the measuring device, the person skilled in the art so far does not require any further explanation.

A difference between the measuring device in accordance with the invention and conventional measuring devices of this type includes for example, a new type of connection with an external processor or to a network in general. This new type of connection in accordance with the invention will be further described in the following using FIG. 2.

As already mentioned, the control program 31 runs on the processor 3 of the control arrangement 2 of the measuring device, which program communicates with the measuring unit 1 and input/output unit 5 and provides for all functionalities of the measuring device. According to one idea of the invention, the processor 3 is provided with a file system, which is implemented by way of a file system program 32 in connection with a memory 4 of the processor 3. Suitable file system programs are known and included in the commonly used processor operating systems. The file system allows the storage of data files in a hierarchical index structure as is known, for example, from PC's.

Figure 2:
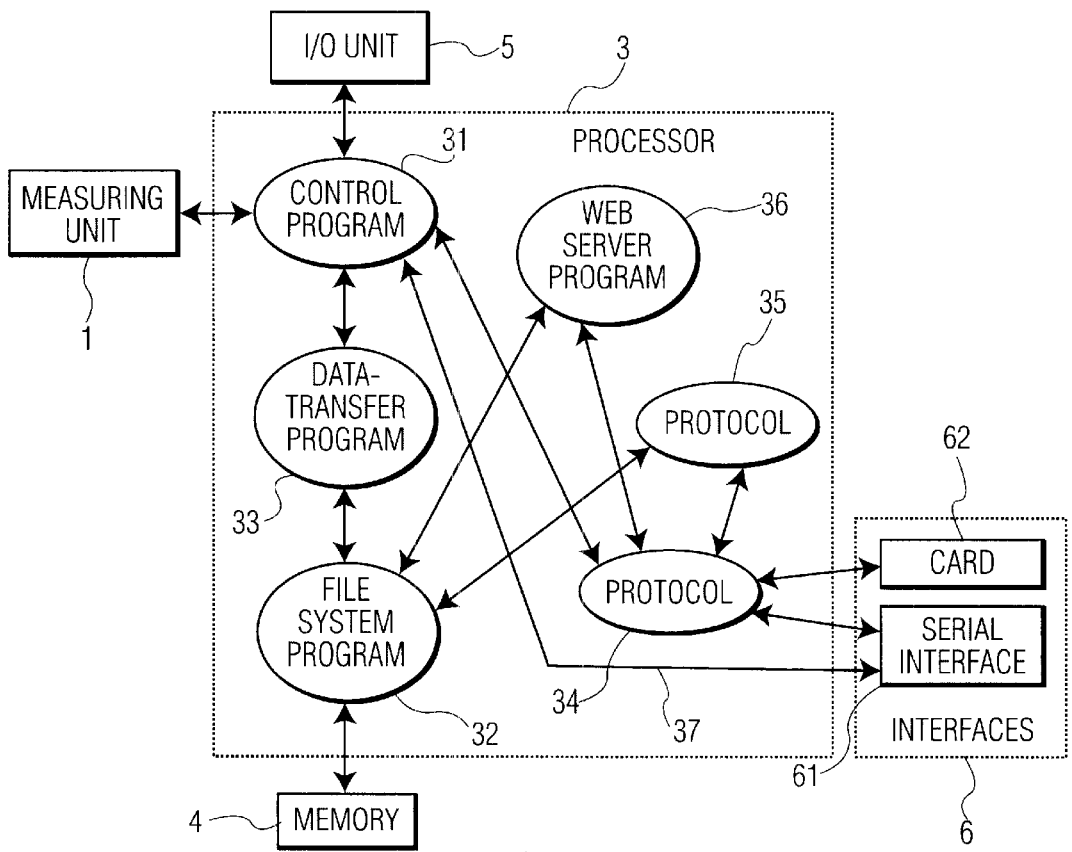
FIG. 2 a schematic illustration of the programs running on the processor of the measuring device.

A measuring device in accordance with the invention is furthermore provided with a network interface. The network interface includes one or more network adaptors (network hardware) provided by the interface means 6 as well as software interfaces or interface protocols cooperating with these network adaptors, which run on the processor 3. A typical implementation thereby includes Ethernet hardware on which the protocols TCP/IP and FTP or HTTP run, or of an RS 232 hardware on which the PPP, TCP/IP and FTP or HTTP protocols run, or a combination of both. In the embodiment of FIG. 2, two network adaptors in the form of an RS 232 interface 61 and an Ethernet or a token ring card 62 are provided. The associated interface protocols are, for example, a TCP/IP protocol 34 and an FTP protocol 35. A web server program 36 further runs on the processor 3 in the form of an HTTP server. The protocols 34 and 35 can, of course, be other pertinent protocols.

The cooperation or function of the described software interfaces and protocols is described in the literature and is not the subject of this invention. The purpose of such network interfaces is among others the establishment of connections for data exchange (of data files) between two processors, as is required, for example, with a peer to peer network or a client/server network or any other network connection such as a WWW connection (FTP or HTTP).

The FTP protocol 35 and the Web-Server program 36 communicate with the file system program 32 and provide that file system to the network 7 through the network hardware 61 and/or 62. An external processor 8 (FIG. 1) connected to the network can also call up from the measuring device data files stored in the file system or itself store data files in the file system of the measuring device. The storage of files can take place, dependent on their content, in defined directories of the file system.

A further advantage of the invention now consists in that the communication of the measuring device with an external processor no longer needs to take place by way of a manufacturer-specific protocol but by way of files stored in the file system. A data-transfer program 33 therefor runs on the processor 3 which cooperates with the control program 31 or is a part thereof. This data-transfer program 33 converts on one hand the detected data into a file of a defined format and writes this file into a directory of the file system. On the other hand, the data-transfer program 33 reads control files stored in the file system and converts them into control data understandable for the control program 31. It is therefore, of course, a prerequisite that the control files are present in a defined, open format. In this manner, the data exchange between the measuring device and the network or an external processor connected thereto is possible without a manufacturer-specific data exchange protocol.

In the illustrated embodiment of the measuring device in accordance with the invention, it is also provided that the data exchange can further also be carried out in the conventional manner, i.e., through the manufacturer-specific protocol. This is symbolized in FIG. 2 by the direct connection 37 between the control program 31 and the serial interface 61. The conversion can be automatic or effected by the user through a protocol preselection at the measuring device and/or the external processor.

The control data contained in the control files can typically be configuration data, control data, speech module data, service data, log data and program expansion data. The data-transfer program 33 can be customized such that it automatically recognizes new or changed control files in the file system. If such a new or changed file is recognized, it is automatically read in and the actions corresponding to its content are triggered, for example, a measurement is carried out, a parameter is adjusted, a program code is loaded, etc. These actions are principally the same as in the conventional measuring devices only that the data exchange is not carried out through the manufacturer-specific protocol but in a standardized manner through the file system.

If a web-server is integrated into the measuring device as in the illustrated embodiment, it can make the measured data and the control data available to the user through HTML pages (i.e., through an appropriate internet browser). These internet pages can include graphics and elements suited for web programming, for example, applications written in java (java applets), active X controls, and so on for the visualization and data processing. The configuration and control of the measuring device (for example, measurement triggering) can also take place through suited HTML-input masks. The data return flow from the external processor to the measuring device is thereby carried out through files which are stored in special predefined directories of the file system of the measuring device, or through commands which are transferred through corresponding serial channels (for example, TCP/IP ports).

Figure 3:
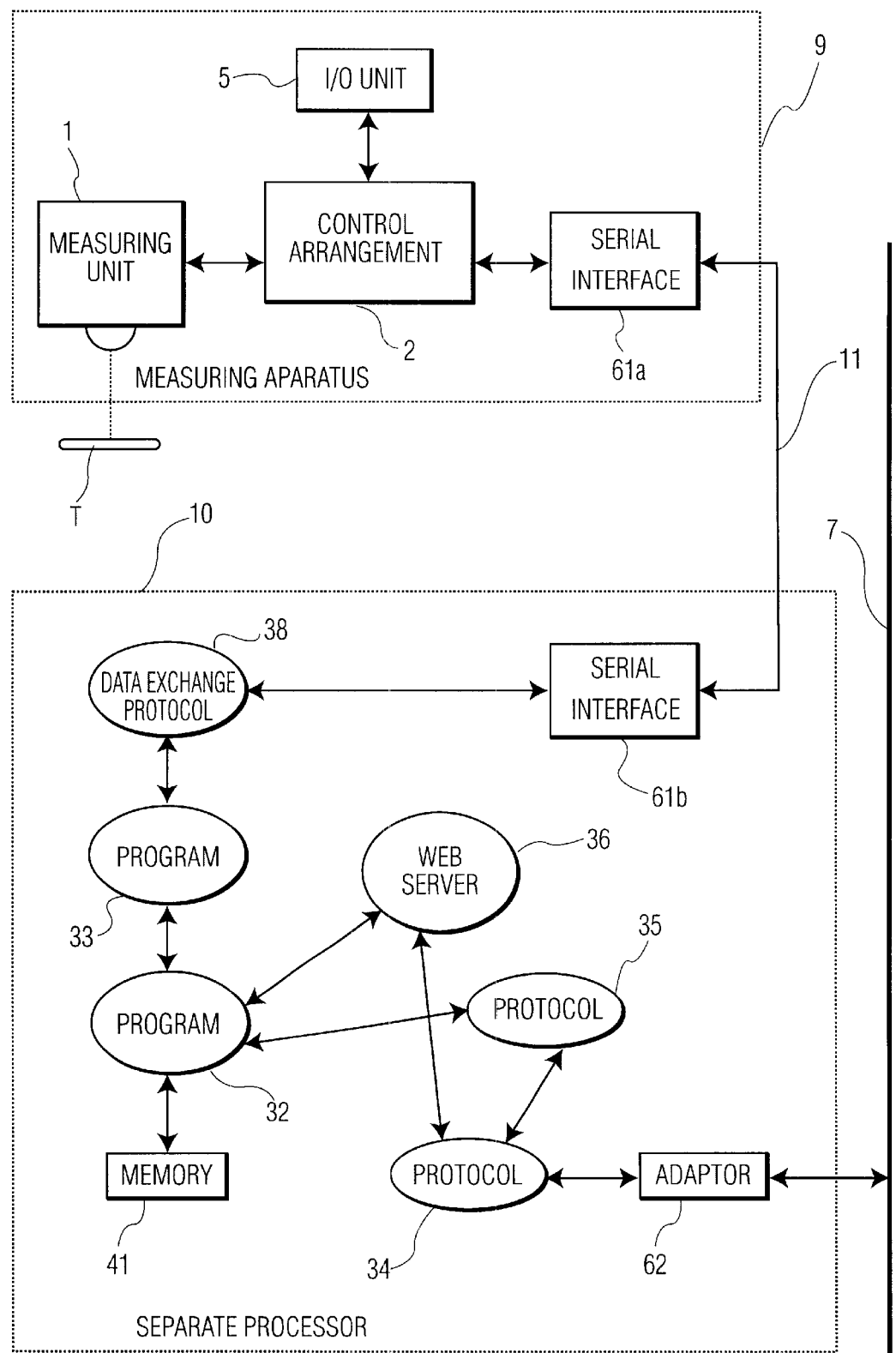
FIG. 3 a principal schematic of an alternative embodiment of the measuring device in accordance with the invention.

An alternative embodiment of the measuring device in accordance with the invention is illustrated in FIG. 3.

The measuring device includes two physically separate functional units, namely a measuring apparatus 9 and a separate processor 10, which are connected through serial interfaces 61a and 61b and a conductor 11 and communicate with one another through the manufacturer-specific data exchange protocol.

The measuring apparatus 9 includes a measuring unit 1, a control arrangement 2, and input/output arrangement 5, and the already mentioned serial interface 61a. It is constructed the same as the measuring device of FIG. 1, with one exception. The exception is that no file system and no network interface are present in the measurement apparatus 9. The file system and the network interface are instead removed to the separate processor 10 and implemented through the programs and protocols 32, 33, 34 and 35 running thereon. The memory required for the file system is referred to as 41 and the network adaptor providing the physical connection to the network 7 carries the reference numeral 62. The manufacturer-specific data exchange protocol running on the separate processor is designated 38, which is responsible for the communication of the separate processor 10 with the measuring apparatus 9 through the serial interfaces 61a and 61b. Furthermore, a web server 36 is integrated into the separate processor 10. Any PC can be used as the separate processor 10.

The functioning of the measuring device is the same as in the embodiments of the FIGS. 1 and 2, the difference residing solely in the placement of the file system and the network interface in the separate processor 10 and not directly in the control arrangement 2 of the measuring device. In this manner, a conventional meter can easily be converted to a measuring device in accordance with the invention. A further embodiment of the measuring device in accordance with the invention, is somewhat of a combination of the two first embodiments. Here the file system is present as in the second embodiment on a separate processor (server), but at the same time, the meter portion is provided with a network interface and the associated software and connected through a network with a separate processor. The detected data are converted in the meter portion into corresponding files and through the network stored in the file system of the separate processor.

The measuring device in accordance with the invention is distinguished by a series of advantageous and practical features. It includes a file system wherein measured data, configuration data, control data, speech modules, service data, log data and firmware extensions, etc. are stored in predefined files and subdirectories. The file system is presented to a network with the help of a suitable network protocol. The communication with the measuring device (measured data, control data) is carried out over the file system with the help of files, which can be accessed through the network with the help of suited protocols (for example, FTP or HTTP). Measured data and control data are present in the form of files with open formats and are stored in the file system. Measured data files can include the measuring result of individual measurements as well as the measurement protocols of multiple measurements and data collections. Firmware extensions can be stored in predefined directories of the file system, which, for example, are programmed in java and extend the functionality of the firmware (control program) of the measuring device, for example, with respect to data processing, data conversion or data visualization. HTML files and elements suited for web programming (for example, java applets) can be stored in predefined subdirectories of the file system which can be accessed by web clients through the incorporated web server. Firmware upgrades can be carried out by storage of a new firmware version in a predefined directory of the file system. Speech extensions (for the communication with the user) and speech upgrades can be carried out the same way by addition/replacement of corresponding text files in pre-defined directories which include the text speech dependent texts. The measuring device can function as a web server on the net, whereby, for example, the presentation of data for the user can be carried out over HTML pages with integrated graphics and processing or visualization of the data by way of embedded components suited for web programming (for example, java applets or active X controls), and whereby the configuration/control of the measuring device (for example, adjustments, measurement triggering, etc.) can be carried out through web pages, which include corresponding input/output fields. Java applets or active X controls or other components suited for web programming can be embedded into these configuration or control pages.

In an alternative embodiment, the measured data, configuration data and control data are transferred to or from a separate processor by way of the manufacturer-dependent protocol and there either stored in the file system of the processor and transferred to other processors by way of a suited protocol (for example, FTP), or transferred to and from web clients with the help of an incorporated web-server functionality. The measuring device in accordance with the invention is not limited to spectrophotometers, colour meters, densitometers and similar photometric applications, but can obviously also be used for any other measuring application.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Processor controlled measuring device for measuring photometric parameters, comprising:

a measuring unit for detecting photometric parameters to be measured and converting them into corresponding electrical signals;

a control arrangement cooperating with the measuring unit for controlling the measuring unit and processing the electrical signals produced thereby, the control arrangement including a processor for running a control program implementing functionalities of the measuring device;

an input/output unit cooperating with the control arrangement for manual operation of the measuring device and for display of measurement results and user guiding information;

interface means which cooperate with the processor such that measured data produced by the measuring device are transmitted to an external processor and such that control data controlling the processor are transmitted to the processor;

a file system connected with the processor wherein at least one of the measured data and the control data can be stored as files of defined format; and means for making the file system available to a network, wherein the communication between the processor and the external processor connected to the network takes place by way of the files stored in the file system such that the processor further runs a data-transfer program which converts the control data stored in the file system into control data understandable by the control program and which converts the measured data into a file of defined format and stores the file in the file system.

2. Device according to claim 1, wherein the control data are selected from the group consisting of: configured data, control data, speech module data, service data, log data, and program extension data, which can be stored in the file system in defined directories as control data files of defined format.

3. Device according to claim 1, wherein the file system is implemented by way of a data system program in connection with a memory controlled by the processor, which data system program runs on the processor of the control arrangement.

4. Device according to claim 3, wherein a standardized data transfer protocol cooperating with the interface means runs on the processor of the control arrangement, which data transfer protocol makes the file system available to the network through the interface means.

5. Device according to claim 3, wherein a web server program which cooperates with the interface means runs on the processor of the control arrangement, which web server program enables data exchange with a web client through the interface means.

6. Device according to claim 1, further comprising: a separate processor connected with the processor of the control arrangement through the interface means and communicating therewith by way of a fixed protocol, the file system being implemented by way of a file system program in connection with a memory controlled by the separate processor which runs on the separate processor, whereby the file system is made available to a network through the separate processor.

7. Device according to claim 6, wherein the separate processor is a web server.

8. Device according to claim 1, wherein the interface means include a network adaptor formed by at least one of a standardized network hardware and a bi-directional serial interface.

9. Device according to claim 1, wherein the measuring device performs functions selected from the group consisting of: a densitometer, a colour meter and a spectrophotometer.

* * * * *